US009341335B2

(12) United States Patent
Weissenberger et al.

(10) Patent No.: US 9,341,335 B2
(45) Date of Patent: May 17, 2016

(54) VEHICLE LIGHTING DEVICE

(71) Applicant: OSRAM GmbH, Munich (DE)

(72) Inventors: Daniel Weissenberger, Giengen (DE); Roland Fiederling, Friedberg (DE)

(73) Assignee: OSRAM GmbH, Munich (DE)

( * ) Notice: Subject to any disclaimer, the term of this patent is extended or adjusted under 35 U.S.C. 154(b) by 85 days.

(21) Appl. No.: 14/106,871

(22) Filed: Dec. 16, 2013

(65) Prior Publication Data

US 2014/0177253 A1 Jun. 26, 2014

(30) Foreign Application Priority Data

Dec. 21, 2012 (DE) ......................... 10 2012 224 345

(51) Int. Cl.
*B60Q 1/04* (2006.01)
*F21S 8/10* (2006.01)

(52) U.S. Cl.
CPC ......... *F21S 48/1145* (2013.01); *F21S 48/1154* (2013.01); *F21S 48/1159* (2013.01); *F21S 48/13* (2013.01); *F21S 48/1721* (2013.01); *F21S 48/1757* (2013.01)

(58) Field of Classification Search
CPC ...... F21S 8/10; F21S 48/1145; F21S 48/1721
USPC .................................................. 362/543–545
See application file for complete search history.

(56) References Cited

U.S. PATENT DOCUMENTS 1,478,236 A * 12/1923 Luby ............................. 362/281
7,261,448 B2 * 8/2007 Ishida et al. .................. 362/507
7,410,282 B2 8/2008 Eichelberger et al.
8,475,022 B2 * 7/2013 Singh et al. .................... 362/523
8,496,365 B2 * 7/2013 Singh et al. .................... 362/527
8,632,228 B2 * 1/2014 Shibata et al. ................ 362/460
2008/0247182 A1 * 10/2008 Yasuda et al. ................ 362/465

FOREIGN PATENT DOCUMENTS

| | | | |
|---|---|---|---|
| DE | 10308703 | A1 | 11/2004 |
| DE | 102005020304 | A1 | 11/2006 |
| DE | 102006051029 | A1 | 7/2007 |
| DE | 102006053019 | A1 | 5/2008 |
| DE | 102008003006 | A1 | 7/2009 |
| EP | 2199664 | A1 | 6/2010 |
| EP | 2522897 | A2 | 11/2012 |
| EP | 2546567 | A2 | 1/2013 |
| WO | 2013042697 | A1 | 3/2013 |

OTHER PUBLICATIONS

English language abstract of DE 10308703 A1 of Nov. 11, 2004.
English language abstract of DE 102005020304 A1 of Nov. 2, 2006.
English language abstract of DE 102006053019 A1 of May 15, 2008.
English language abstract of DE 102008003006 A1 of Jul. 9, 2009.
English language abstract of EP 2199664 A1 of Jun. 23, 2010.
Search Report issued in the corresponding German application No. 102012224345.3, dated Sep. 19, 2013, 5 pages.

* cited by examiner

*Primary Examiner* — Anabel Ton
(74) *Attorney, Agent, or Firm* — Viering, Jentschura & PartnermbB

(57) ABSTRACT

In various embodiments, a vehicle lighting device is provided. The vehicle lighting device may include at least one semiconductor light source; and at least one optical element which is connected downstream, wherein the position of the at least one optical element can be adjusted.

3 Claims, 3 Drawing Sheets

VEHICLE LIGHTING DEVICE

CROSS-REFERENCE TO RELATED APPLICATION

This application claims priority to German Patent Application Serial No. 10 2012 224 345.3, which was filed Dec. 21, 2012, and is incorporated herein by reference in its entirety.

TECHNICAL FIELD

Various embodiments relate to a vehicle lighting device, having at least one semiconductor light source and at least one optical element which is connected downstream. Various embodiments may be applied, for example, to adaptive vehicle headlights.

BACKGROUND

In current projection modules in front headlights of passenger motor vehicles, automatic headlight leveling is used. The projection modules are typically accommodated in a permanently installed headlight housing. For the automatic headlight leveling, the entire projection module within the headlight housing is tilted and therefore a light/dark boundary corresponding to a vehicle load is set. The automatic headlight leveling is legally prescribed for LED headlights (which use light-emitting diodes, LEDs, as a light source) and HID ("High Intensity Discharge") headlights with a minimum luminous flux of 2000 lumens (1 m). In particular in the case of LED headlights, it is, however, necessary to make available bulky cooling systems in the headlight in order to cool the LEDs. These cooling systems are connected to the LEDs in a mechanically stable fashion, with the result that the tilting of the entire light module in the headlight becomes very complicated or impossible under certain circumstances.

In order to implement dynamic cornering light (also referred to as AFS, "Adaptive Frontlighting System") for a main light function, HID modules are nowadays mechanically pivoted also by motors, specifically about a vertical axis. In the case of AFS applications (according to ECER123), it is, for example, permitted to raise the light/dark boundary in the operating mode "freeway light" or "poor weather light", from −0.57° h to a maximum of −0.23° h, or to a value between said values. In order to implement this, movable shutters are used in the projection modules.

SUMMARY

In various embodiments, a vehicle lighting device is provided. The vehicle lighting device may include at least one semiconductor light source; and at least one optical element which is connected downstream, wherein the position of the at least one optical element can be adjusted.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The properties, features and advantages of this invention which are described above and the way in which they are achieved will become clearer and more clearly comprehensible in conjunction with the following schematic description of exemplary embodiments which are explained in more detail in relation to the drawings. In this context, for the sake of clarity, identical or identically acting elements can be provided with the same reference signs.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

Various embodiments overcome, at least partially, the disadvantages of the prior art and, for example, provide improved pivotability of a light emission pattern of a vehicle lighting device, e.g. of a light/dark boundary, having at least one semiconductor light source.

Figure 1:
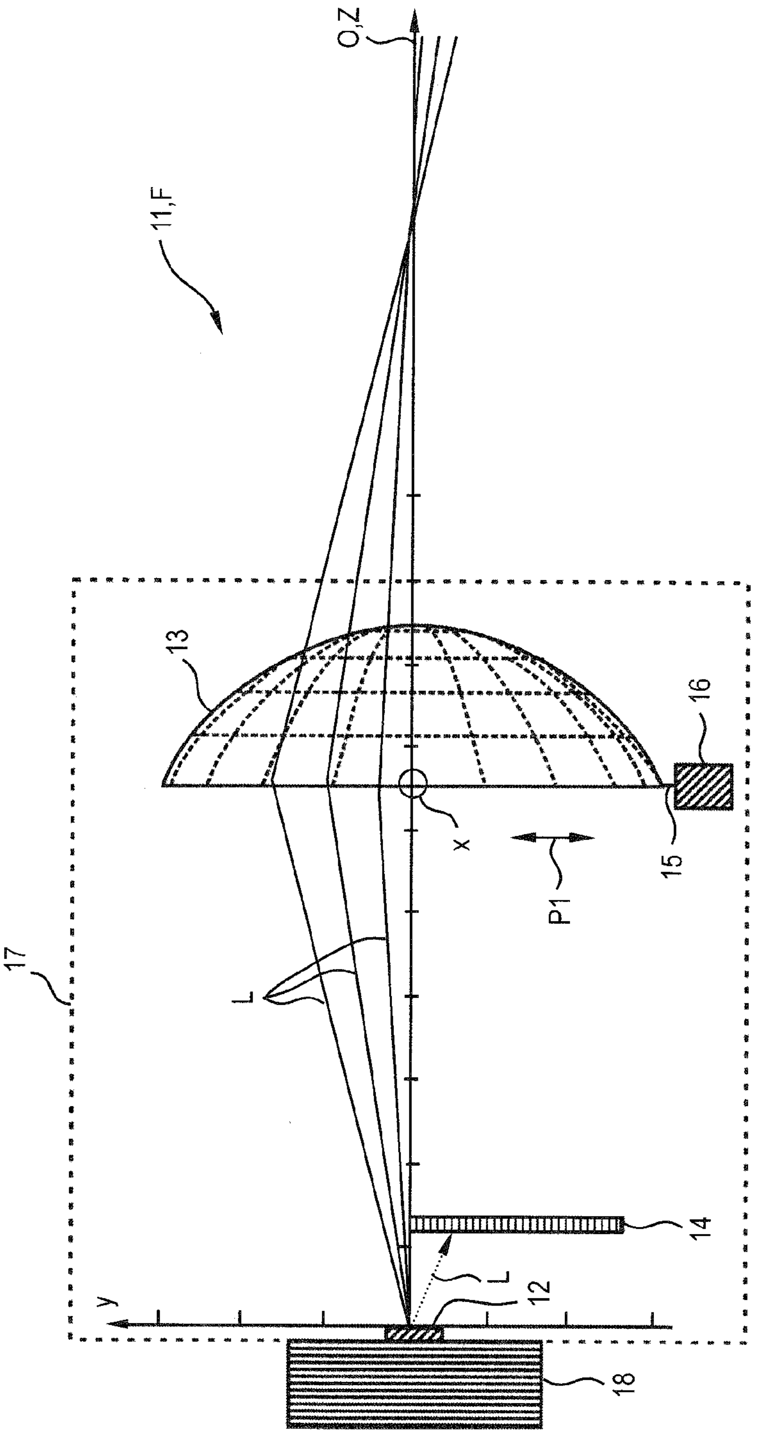
FIG. 1 shows a sectional side view of a first vehicle lighting device according to various embodiments with a lens whose position is not adjusted.

FIG. 1 shows a sectional side view of components of a vehicle lighting device in the form of a directly imaging refractive headlight 11, specifically a semiconductor light source in the form of at least one light-emitting diode 12 and an optical transmitted light element, which is optically connected downstream of the light-emitting diode 12, in the form of a plane-convex lens 13 made of transparent glass or plastic. The at least one light-emitting diode 12 may be located, in various embodiments, in a focal point of the lens 13. In the basic position shown, an optical axis O of the lens 13 corresponds to a main emission direction of the light-emitting diode 12 which emits, in various embodiments, symmetrically with respect to the optical axis O. The optical axis O can, in various embodiments, also correspond to an axis of symmetry or longitudinal axis z of the headlight 11. Light L which is emitted by the light-emitting diode 12 is therefore directed onto the lens 13 and deflected thereby. In order to make available a dipped light property of the headlight 11, purely by way of example a shutter 14 is used which blocks light L which is incident here into a lower half space, and as a result darkens an upper region in a far field behind the lens 13. The shutter 14 generates here a horizontally extending defined light/dark boundary in the light emission pattern behind the lens 13.

Figure 2:
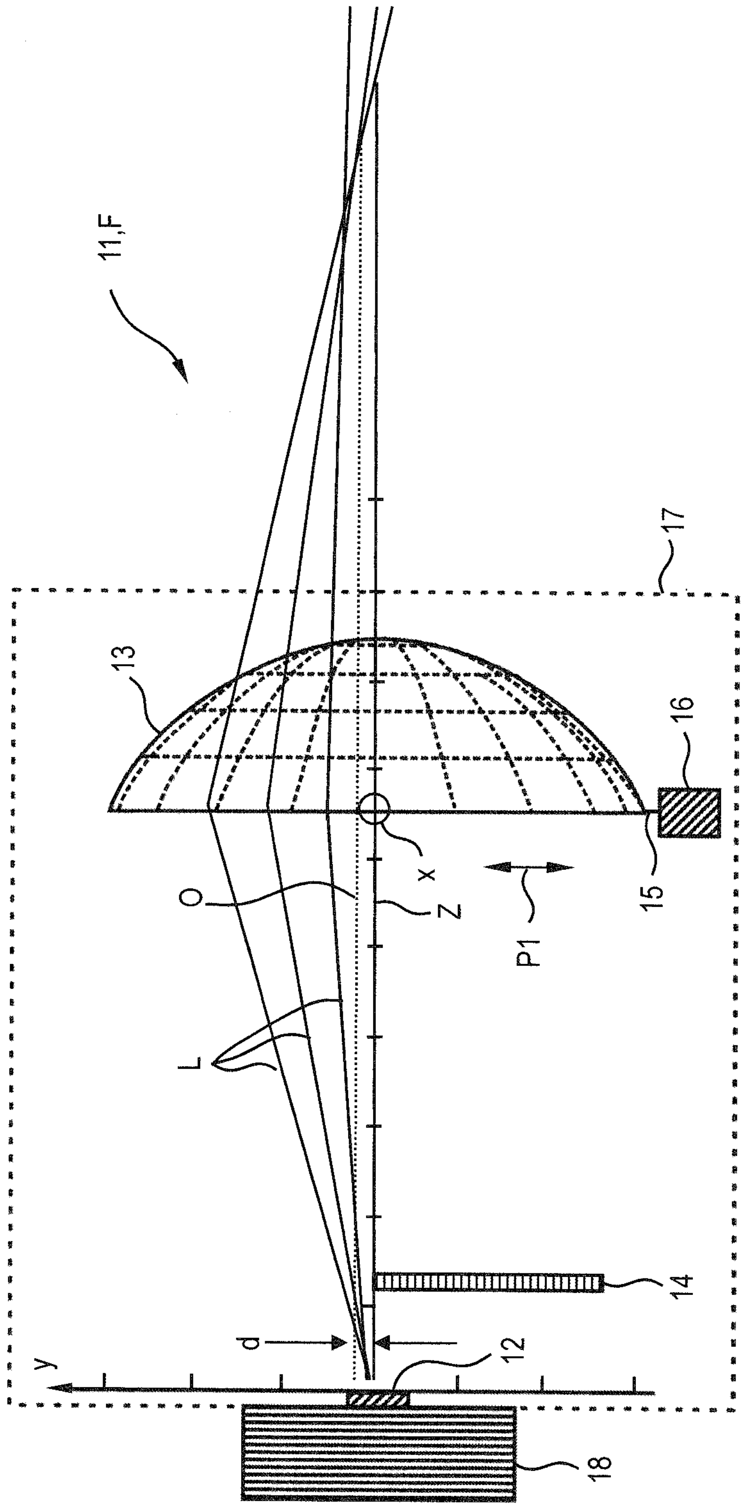
FIG. 2 shows a sectional side view of the first vehicle lighting device according to various embodiments with a lens whose position is adjusted.

The lens 13 is connected via a longitudinally displaceable plunger 15 to an adjustment device in the form of a piezo-actuator 16. Through actuation of the piezo-actuator 16, the lens 13 can be displaced here perpendicularly with respect to the optical axis O, vertically along a y axis (as indicated by the arrow P1), specifically in an infinitely adjustable fashion by ±1 mm. FIG. 2 shows an upward displacement d of the lens 13. This displacement d changes the projection angle in the far field. As a result, in turn it is possible, for example, to displace the vertical position of the horizontally extending light/dark boundary. The magnitude of the vertical displacement or deflection of the lens 13 depends on the change in the target angle and on the imaging scale of the projection system. If it is desired, for example, to achieve a change in the light/dark boundary by an angle of 0.1°, specifically with a focal lens 100 mm or 50 mm, displacement d of the lens 13 of approximately 0.2 mm or 0.1 mm is necessary.

The above-mentioned parts 12 to 16 are accommodated in a housing 17 of the headlight 11 which is fixedly connected to the rest of the vehicle F. On the outside of the housing 17 there is a heat sink 18 which is thermally connected to the at least one light-emitting diode 12 and can conduct away waste heat generated thereby. The headlight 11 has the advantage that the light-emitting diode 12 and the heat sink 18 do not need to be moved along and the headlight can for this purpose be implemented in a compact, robust and economical fashion.

Figure 3:
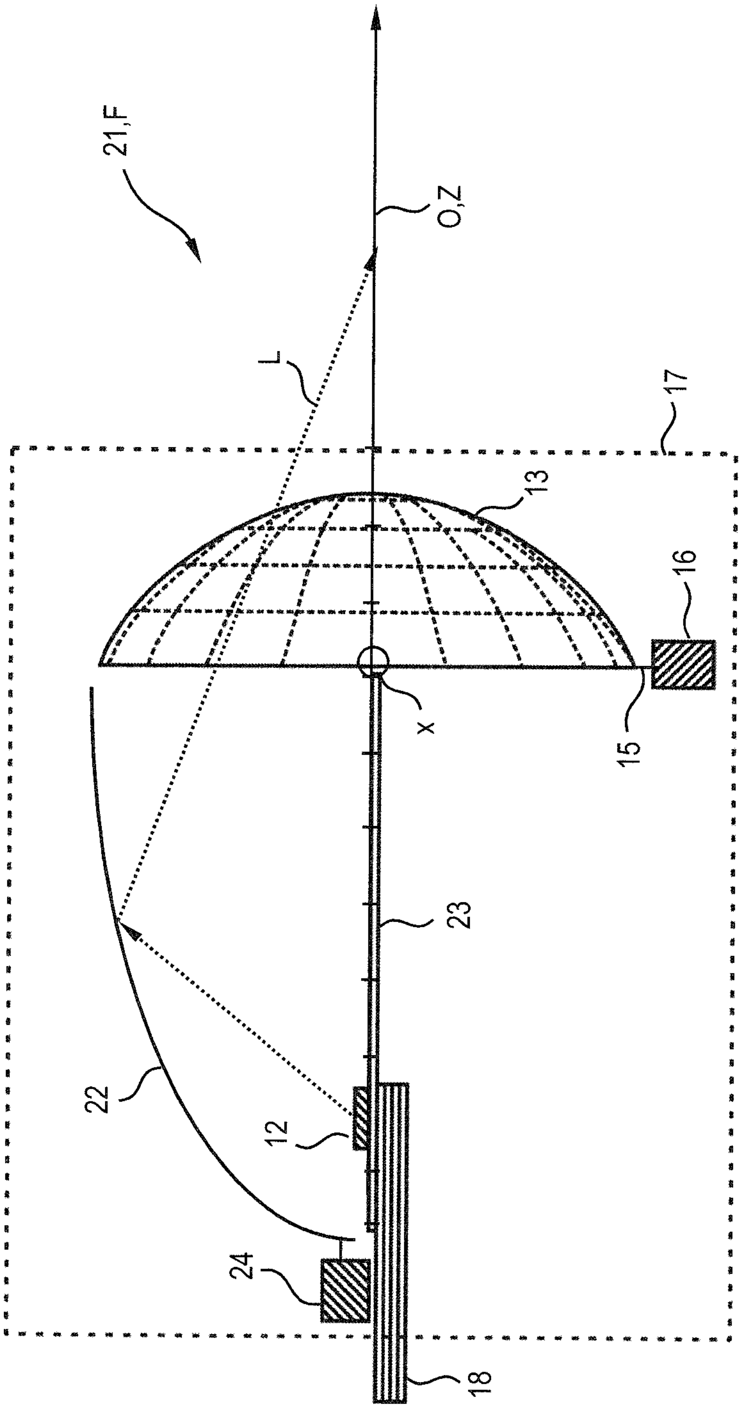
FIG. 3 shows a sectional side view of a second vehicle lighting device according to various embodiments with a lens whose position is not adjusted.

FIG. 3 shows a headlight 21 which, in contrast to the headlight 11, additionally has an ellipsoidal half-shell reflector 22 in its upper half space. The at least one light-emitting diode 12 is directed upward onto the half-shell reflector 22 vertically with respect to the (horizontally oriented) optical axis O. For this reason, the greater portion of the light L which is emitted by the at least one light-emitting diode 12 is firstly reflected at the half-shell reflector 22 and then directed onto the lens 13. Only a relatively small portion of the light L is directly incident from the light-emitting diode 12 onto the lens 13. The light-emitting diode 12 is arranged on a plate-shaped carrier 23, which carrier 23 covers an open, lower surface of the half-shell reflector 22 and as a result also serves as a shutter for forming a defined light/dark boundary.

The light-emitting diode 12 can be located in a focal point of the half-shell reflector 22 or in the vicinity thereof and/or can be located in a focal point of the lens 13 or in the vicinity thereof. A distance of the lens from the half-shell reflector 22 along the z axis is basically freely selectable. The lens 13 can be located, for example, in a light exit plane of the half-shell reflector 22 (distance=0) or be at a distance therefrom.

The position of the half-shell reflector 22 can be adjusted as an alternative to or in addition to the lens 13, for example can be rotated about the optical axis O, specifically by connection to a corresponding adjustment device 24.

Although the invention was illustrated and described in more detail by means of the exemplary embodiment shown, the embodiments are not restricted thereto and other variations can also be derived therefrom by a person skilled in the art without departing from the scope of protection of the invention.

The lens 13 can therefore also be displaced along the optical axis O or z axis, if appropriate, by the same piezo-actuator 16 or by another adjustment device, in order to adjust a definition of an image.

As an alternative to, or in addition to, displacement if appropriate, in the direction of the vertical y axis, the lens 13 can, if appropriate, be displaced perpendicularly with respect to the optical axis O in a horizontal x axis by means of the same piezo-actuator 16 or by means of another adjustment device.

Alternatively or additionally, the lens 13 can be tiltable, if appropriate, in particular perpendicularly with respect to its optical axis O, by the same piezo-actuator 16 or by another adjustment device.

Alternatively or additionally, the lens 13 can be rotatable about its optical axis O, if appropriate, by the same piezo-actuator 16 or by another adjustment device.

The statements regarding the lens 13 apply analogously to the reflector.

Various embodiments provide a vehicle lighting device, having at least one semiconductor light source and at least one optical element which is connected downstream (of the at least one semiconductor light source), wherein the position of the at least one optical element can be adjusted. As a result, the light emission pattern may be varied without having also to adjust the semiconductor light source or sources and a cooling device which is, if appropriate, connected thereto. This simplifies or even firstly permits dynamic adjustment of the light emission pattern in the case of vehicle lighting devices which are equipped with a semiconductor light source or semiconductor light sources.

The at least one semiconductor light source may include at least one light-emitting diode. When a plurality of light-emitting diodes are present, they can light up in the same color or in different colors. One color may be monochrome (for example red, green, blue etc.) or multichrome (for example white). The light which is emitted by the at least one light-emitting diode may also be an infrared light (IR-LED) or an ultraviolet light (UV-LED). A plurality of light-emitting diodes may generate a mixed light, for example a white mixed light. The at least one light-emitting diode may contain at least one wavelength-converting luminescent material (conversion LED). The luminescent material may be alternatively or additionally arranged remotely from the light-emitting diode ("remote phosphor"). The at least one light-emitting diode may be present in the form of at least one individually housed light-emitting diode or in the form of at least one LED chip. A plurality of LED chips may be mounted on a common substrate ("submount"). The at least one light-emitting diode may be equipped with at least a separate and/or common optical system for directing the beam, for example at least one Fresnel lens, collimator and so on. Instead of or in addition to inorganic light-emitting diodes, for example based on InGaN or AlInGaP, organic LEDs (OLEDs, for example polymer OLEDs) may generally also be used. Alternatively, the at least one semiconductor light source may have, for example, at least one laser, in particular a diode laser. In various embodiments, at least one remotely positioned luminescent material (LARP, "Laser Activated Remote Phosphor") may be connected downstream of the laser.

There is also a development in which at least one optical element which is connected downstream of the at least one semiconductor light source is an imaging optical element.

There is a refinement in which the at least one optical element has at least one lens, i.e. one or more lenses ("lens package"). When there are a plurality of lenses, the position of one or more lenses may be adjusted.

There is also a refinement in which the at least one optical element has at least one reflector. There is a development in which at least one reflector, for example parabolic reflector, is connected between the at least one semiconductor light source and the at least one lens. As a result, at least a portion of the light emitted by the at least one semiconductor light source and/or a wavelength-converting converter element at a distance therefrom, having, for example, luminescent material, may be directed onto the lens after reflection at the at least one reflector. Depending on the refinement, a portion of the light emitted by the at least one semiconductor light source or the at least one converter element may be directly incident on the lens.

The at least one semiconductor light source or a converter element emitted thereby may be located, in various embodiments, in, or in the vicinity of, a focal point of the at least one reflector.

The vehicle lighting device may, in various embodiments, be a projection device.

There is a development in which the vehicle lighting device is a headlight. However, the vehicle lighting device may, for example, also be a rear light or a signal light. Generally, the vehicle lighting device is not limited to land-based vehicles such as passenger cars, trucks, two-wheeled vehicles, tractors etc. but instead may, for example, also include aircraft or ships etc.

There is also a development in which the vehicle lighting device has a housing in which at least the at least one semiconductor light source, the reflector (if present) and the at least one optical element are located. Such a housing has at least one translucent region ("headlight glass"), for example made of glass or plastic, and is typically connected in a fixed or non-movable fashion to the associated vehicle. The housing provides, inter alia, protection for the elements accommodated therein against soiling and corrosion.

There is a refinement in which the at least one optical element is linearly displaceable perpendicularly with respect to its optical axis. As a result, the light distribution pattern, in various embodiments, an associated light/dark boundary, can particularly easily be displaced upward or downward. This can be achieved, in various embodiments, with a lens as the optical element, for example, on the basis of a change in an emission angle which is brought about by the displacement. This refinement permits, in various embodiments, easy implementation of, even automatic, headlight leveling.

There is also a refinement in which the at least one optical element can be tilted perpendicularly with respect to its optical axis. The tilting can basically occur about any such axis, for example about a horizontal axis for displacing the light emission pattern upward or downward or about a vertical axis for the purpose of displacement to the left or right.

There is also a refinement in which the at least one optical element can be rotated about its optical axis. The light emission pattern may therefore be selectively changed. Generally, the optical element does not need to be completely rotationally symmetrical. It may be configured, for example, in an oval or free-formed fashion.

There is also a further refinement in which the at least one optical element is linearly displaceable along its optical axis. As a result, in various embodiments, a definition of the light emission pattern can be varied or corrected.

There is a development in which the position of at least one optical element can be adjusted by means of one adjustment device. The type of the at least one adjustment device is basically not limited and may include, for example, one or more electric motors.

There is also a development in which the position of at least one optical element can be adjusted by means of at least one micro-actuator. A micro-actuator may be understood to be, in particular, an actuator or another adjustment unit which has an adjustment path of not more than 2 mm overall or of +/−1 mm (that is to say 1 mm in every direction). This adjustment path is generally sufficient for headlight leveling, in various embodiments, for motor vehicle headlights, and additionally prevents formation of significant imaging errors.

There is a refinement in which the position of the at least one optical element can be adjusted by means of at least one volume deformation actuator, e.g. piezo-actuator. Volume deformation actuators such as piezo-electric, magneto-restrictive or electro-restrictive actuators, are compact and robust and their adjustment path may be set very precisely in small increments or even in an infinitely adjustable fashion. In various embodiments, the at least one volume deformation actuator can be accommodated in the housing, with the result that feedthroughs through the housing, for example in order to feed through a shaft or a plunger, can be dispensed with. A volume deformation actuator may generally be understood to be an actuator whose adjustment is brought about by means of deformation of a material volume on the basis of externally applied (electrical, magnetic etc.) signals.

There is a development in which the at least one optical element is connected to at least one guide means (for example a joint or a guide rail) and the position of which on the guide means can be adjusted by means of the at least one adjustment unit (for example can be rotated about the joint or displaced along the guide rail).

There is also a development in which the at least one optical element can be freely positioned by the at least one adjustment unit, e.g. by at least three adjustment units. This enables the position of the at least one optical element to be changed in a particularly versatile fashion, e.g. in all three dimensions. In various embodiments, at least one optical element can be freely suspended from or coupled to a plurality of adjustment units (without further guide means).

There is also a refinement in which the position of the at least one optical element can be adjusted in order to displace a light/dark boundary.

There is also a refinement in which the vehicle lighting device has or generates a plurality of partial regions of a light emission pattern which can be illuminated separately or individually, in which light beams associated with the partial regions are directed by respective optical elements and in which the position of at least one of the optical elements can be adjusted in order to orient an associated partial region. The light bundles which are associated with the partial regions can illuminate, for example, various spatial angles. The vehicle lighting device can be, for example, a matrix light application with various light modules, which application generates partial regions or light distributions which are bounded spatially in the far field and which have to be added to one another in a seamless fashion. By virtue of this refinement, in various embodiments, various adjoining partial regions of a common light emission pattern can be oriented with respect to one another, e.g. positioned one against the other in a seamless fashion.

For example in the event of the vehicle lighting device generating a plurality of partial regions of a light emission pattern which can be illuminated separately or individually or having respective light modules therefor, it is advantageous that the optical element can be displaced and/or tilted or pivoted in such a way that the associated light emission pattern can be displaced within an angular range of 0.1° and less. This can be achieved easily, in particular by means of a volume deformation actuator.

There is also a refinement in which the at least one semiconductor light source, the at least one optical element and at least one adjustment device which is provided for adjusting the at least one optical element are accommodated in a common housing.

Furthermore, there is a refinement in which a heat sink for cooling the at least one semiconductor light source is arranged fixedly with respect to the housing. The heat sink may be arranged, in particular, outside the housing. The heat sink may be secured, e.g. fixedly to the housing.

Generally, "a" and "one", etc. can be understood to refer to a single number or a plurality, in particular in the sense of "at least one" or "one or more" etc. as long as this is not explicitly excluded, for example by the expression "precisely one" etc.

A numerical indication can also precisely include the specified number also as a customary tolerance range as long as this is not explicitly excluded.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A vehicle lighting device, comprising:

at least one semiconductor light source, an horizontally oriented optical axis; and at least one optical element which is connected downstream, said at least one optical element comprising a half-shell reflector and a lens, wherein the half-shell reflector is arranged in an upper half space of the vehicle headlight; and the vehicle lighting device being configured so that light emitted by the at least one semiconductor element is directed upward onto the half-shell reflector and a major portion of the light emitted by the at least one semiconductor light source is firstly reflected at the half-shell reflector and then directed onto the lens, wherein the vehicle lighting device comprises an adjustment device connected the half-shell reflector for adjusting the position of the half-shell reflector or for rotating the half-shell reflector about the optical axis, and wherein the vehicle lighting device comprises a further adjustment device which is connected to the lens and configured to displace the lens perpendicularly with respect to the optical axis or along the optical axis or both.

2. The vehicle lighting device of claim 1, wherein the further adjustment device is in the form of a piezo-actuator.

3. The vehicle lighting device of claim 1, wherein the position of the at least one optical element can be adjusted in order to displace a light/dark boundary.

* * * * *